(12) United States Patent
Pritchard et al.

(10) Patent No.: US 7,534,188 B2
(45) Date of Patent: May 19, 2009

(54) TRANSFER CASE INPUT SHAFT BRAKE SYSTEM

(75) Inventors: Larry Pritchard, Macomb, MI (US); Christopher V. Kurmaniak, Clarkston, MI (US)

(73) Assignee: BorgWarner Inc., Auburn Hills, MI (US)

( * ) Notice: Subject to any disclaimer, the term of this patent is extended or adjusted under 35 U.S.C. 154(b) by 384 days.

(21) Appl. No.: 11/586,413

(22) Filed: Oct. 25, 2006

(65) Prior Publication Data

US 2007/0179010 A1 Aug. 2, 2007

Related U.S. Application Data

(60) Provisional application No. 60/762,667, filed on Jan. 27, 2006.

(51) Int. Cl.
*F16H 3/44* (2006.01)
*F16D 51/00* (2006.01)

(52) U.S. Cl. ................ 475/323; 475/900; 188/77 W

(58) Field of Classification Search ............ 475/154, 475/157, 204, 221, 223, 323, 900; 180/248, 180/249; 188/77 R, 77 W; 192/17 R, 80
See application file for complete search history.

(56) References Cited

U.S. PATENT DOCUMENTS

| | | | |
|---|---|---|---|
| 2,975,870 A | 3/1961 | Vosler et al. | |
| 4,384,637 A | 5/1983 | Runkle | |
| 4,834,220 A * | 5/1989 | Nowak | 188/85 |
| 4,862,770 A * | 9/1989 | Smith | 475/324 |
| 5,061,229 A | 10/1991 | Tsukamoto et al. | |
| 5,122,099 A * | 6/1992 | Boedo et al. | 475/187 |
| 5,226,503 A * | 7/1993 | Muller | 180/249 |
| 5,334,116 A | 8/1994 | Baxter, Jr. | |
| 5,445,246 A | 8/1995 | Haka et al. | |
| 5,609,229 A * | 3/1997 | Sell | 188/77 R |
| 5,842,947 A | 12/1998 | Weilant | |
| 6,485,390 B2 | 11/2002 | Inoue | |
| 6,959,778 B2 * | 11/2005 | Wood et al. | 180/248 |
| 2004/0180747 A1 * | 9/2004 | Weilant et al. | 475/154 |
| 2005/0009663 A1 * | 1/2005 | Kingston et al. | 475/331 |

* cited by examiner

*Primary Examiner*—Roger Pang
(74) *Attorney, Agent, or Firm*—Warn Partners, P.C.

(57) ABSTRACT

A two-speed transfer case includes a planetary gear assembly, and a shift sleeve that is used for selecting either the reduced speed gear ratio, in which the torque from the input is transferred though the planetary gears, or the direct drive speed ratio, in which the input and output shafts are coupled directly together. The carrier of the planetary gear assembly is equipped with a surface that is capable of receiving a band brake that is disposed thereabout. A lever composed to two pieces, a brake apply arm and a cam follower, applies the brake band, and in doing so controls retardation of the planet carrier, controlling the speed of the carrier, and thus, controlling the output of the planetary gear assembly.

16 Claims, 3 Drawing Sheets

US 7,534,188 B2

TRANSFER CASE INPUT SHAFT BRAKE SYSTEM

CROSS-REFERENCE TO RELATED APPLICATIONS

This application claims the benefit of U.S. Provisional Application No. 60/762,667, filed Jan. 27, 2006. The disclosure of which is hereby incorporated by reference.

FIELD OF THE INVENTION

The present invention relates to a transfer case input shaft brake band mechanism.

BACKGROUND OF THE INVENTION

The present invention generally relates to two-speed transfer cases which use a planetary gear reduction set with a carrier that is surrounded by a variable controlled band brake assembly.

Most four-wheel drive vehicles utilize a transfer case of some sort that receives input torque from a transmission. The transfer case always provides output to a primary driveline, but its main purpose is to selectively provide output to a secondary driveline, and does so when the vehicle operator commands it. Typical transfer cases have various ways of engaging the secondary driveline, such as an operator actuated hydraulic clutch, or an automatic system that controls the clutch and works in response to various driving conditions, such as wheel slip.

Current transfer case designs utilize a planetary gear speed reduction assembly combined with a dog clutch or similar apparatus, to provide both a reduced speed drive through the use of the planetary gear assembly or a direct drive by directly coupling the input and output shafts of the transfer case together.

Several current methods that are used to shift the vehicle into and out of four-wheel drive demonstrate that the incorporation of the use of a transfer case into the complete operation of the vehicle has not been without its difficulties. In applications where a four wheel drive vehicle must be stopped and the automatic transmission placed in neutral to perform a range shift from high to low or vice versa. When this occurs the issue becomes trying to shift the transfer case against neutral drag torque of the automatic transmission. Thus the one obstacle in performing shifts within a transfer case is the synchronization of the high and low speed drives to the transmission output shaft.

SUMMARY OF THE INVENTION

A two-speed transfer case includes a planetary gear assembly, and a shift sleeve that is used for selecting either the reduced speed gear ratio, in which the torque from the input is transferred though the planetary gears, or the direct drive speed ratio, in which the input and output shafts are coupled directly together. The carrier of the planetary gear assembly is equipped with a surface that is capable of receiving a band brake that is disposed thereabout. A lever composed to two pieces, a brake apply arm and a cam follower, applies the brake band, and in doing so controls retardation of the planet carrier, controlling the speed of the carrier, and thus, controlling the output of the planetary gear assembly.

In applications where a four wheel drive vehicle must be stopped and the automatic transmission placed in neutral to perform a range shift from high to low or vice versa. When this occurs the issue becomes trying to shift the transfer case against neutral drag torque of the automatic transmission. Thus the one obstacle in performing shifts within a transfer case is the synchronization of the high and low speed drives to the transmission output shaft. This invention eliminates the drag torque by braking or stopping the input shaft to the transfer case to allow a shift to occur. The brake band can also function as a parking brake when fully engaged.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
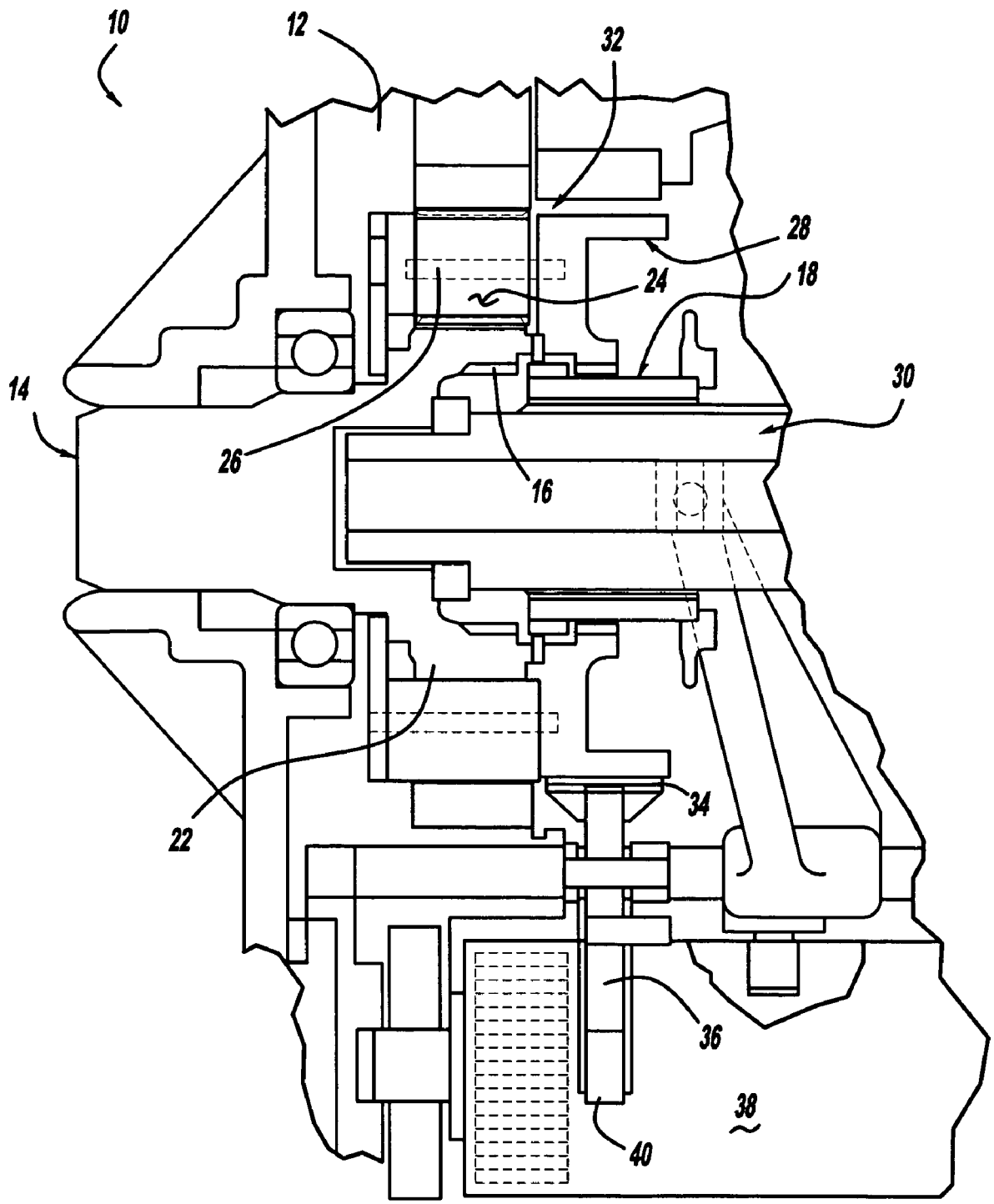
FIG. 1 is an enlarged, fragmentary sectional view of a motor vehicle transfer case according to the present invention.
Figure 2:
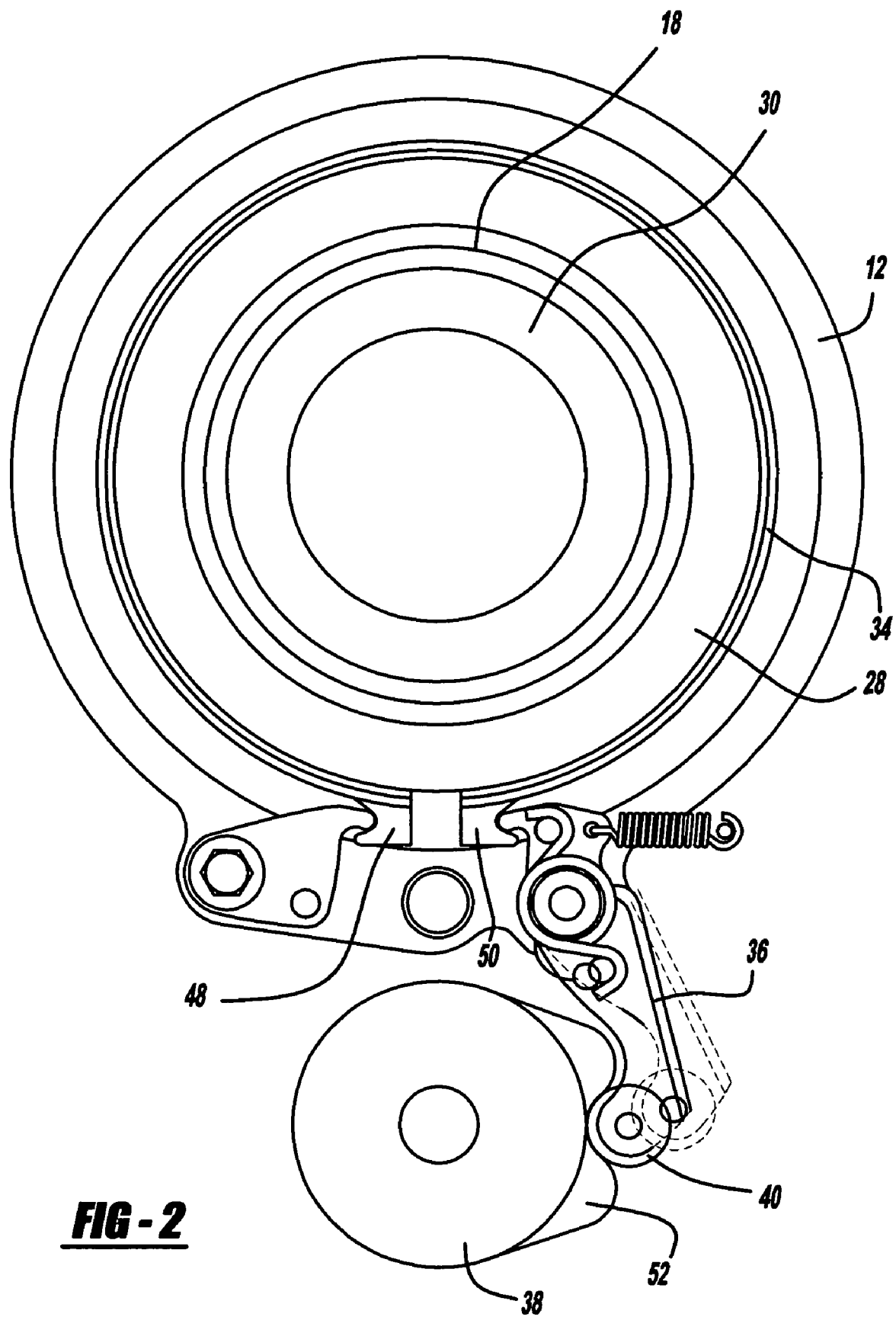
FIG. 2 is a full sectional view of the band brake assembly according to the present invention.
Figure 3:
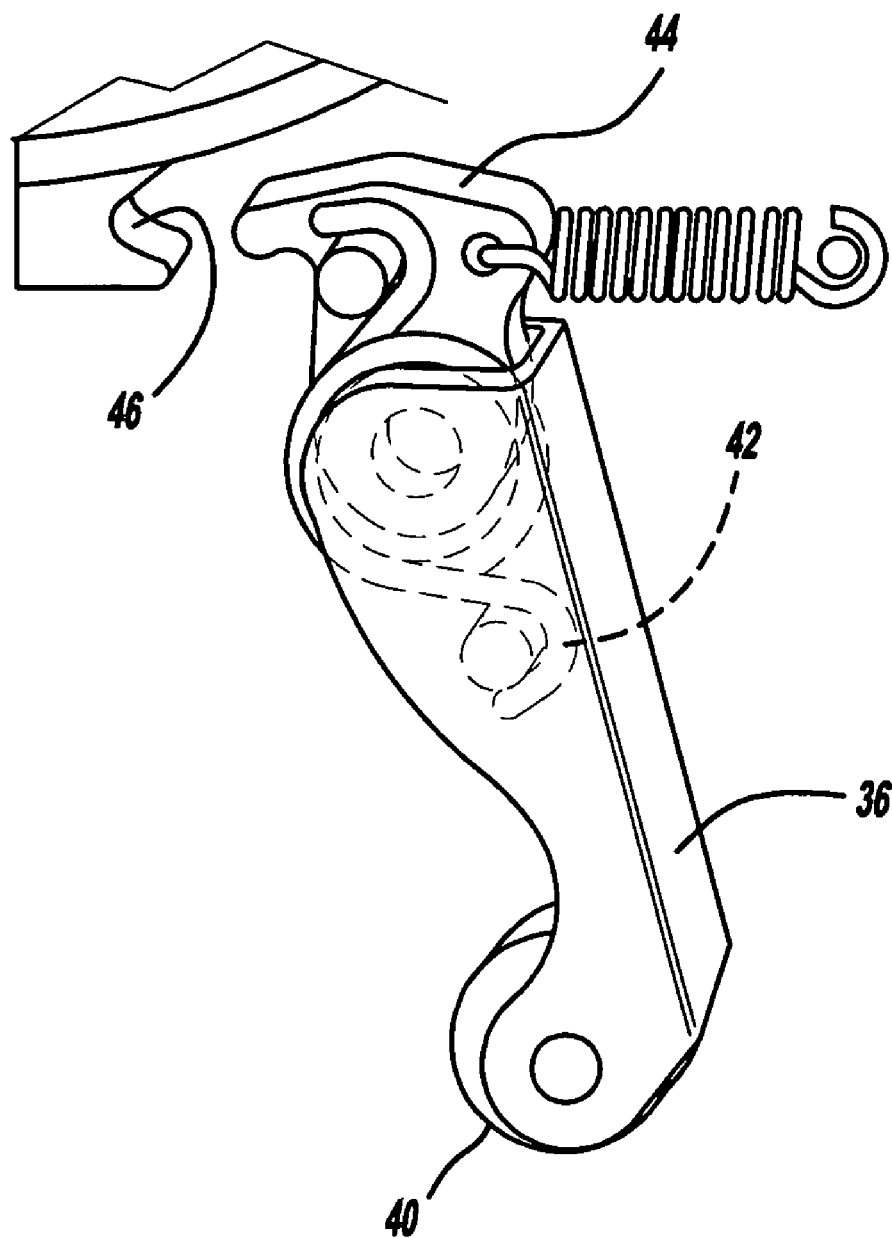
FIG. 3 is a full three dimensional view of the lever, including the brake apply arm and cam follower.

Referring now to FIGS. 1-3. A transfer case, input shaft brake system is shown. A transfer case, generally shown at 10, typically consists of a casing 12 that possesses various openings, for shafts and fasteners, as well as various mounting surfaces and grooves for shaft seals, bearings, seal retaining grooves and other internal components. Torque from the transmission is transferred to an input shaft 14, which possesses a plurality of splines 16, which are capable of coupling with the transmission (not shown) on one end, and are also capable of coupling with the dog clutch 18 on a second end. The input shaft 14 also has a sun gear 22. The sun gear 22 is preferably integrally formed on and rotates with the input shaft 14. The sun gear 22 is meshed engagement with two or more planetary gears 24. The planetary gears 24 are received and supported by roller bearings, which are supported by stub shafts 26. The stub shafts 26 are mounted and retained within a planet gear carrier 28. A primary output shaft 30, the planetary gear reduction set 32 and the dog clutch, allow for selective coupling to the secondary output shaft (not shown), and electromagnetic clutch (not shown).

A brake band 34 is disposed around the planet gear carrier 28. The brake band 34 has two ends 48, 50 that are capable of being moved relative to each other in order to tighten or loosen the brake band 34. The brake band 34 can have friction material on the surface adjacent the planet gear carrier 28 in order to slow the rotation of the planet gear carrier 28 during shifts. The movement of the ends 48, 50 of the brake band 34 is facilitated the rotation of a cam 38 which causes a lever 36 to act on one of the ends 50 of the brake band 34. The lever 36 has a cam follower 40 that rolls along the surface of the cam 38. The cam 38 has a cam surface 52 that has ridges which will cause the lever 36 to pivot. The lever 36 has an apply arm 44 that will contact a shoulder portion 46 that is connected to one of the ends 50 of the brake band 34. The apply arm 44 is connected to the lever 36 by a torsion spring 42 which is biased to move the apply arm 44 away from the shoulder 46.

In operation when the cam 38 rotates the cam follower 40 will roll along the cam surface 52 which causes the lever 36 to pivot. When the lever 36 pivots the apply arm 44 will come in contact with the shoulder 46 which in turn causes the two ends 48, 50 of the brake band 34 to move together and tighten the brake band 34. When the brake band 34 is tightened its surface comes into contact with the planet gear carrier 28. The friction created between the planet gear carrier 28 and the brake band 34 will cause the rotation of the planet gear carrier 28 to slow down. This is particularly desirable during shift operations that occur in the transfer case 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A planetary gear carrier brake assembly comprising, in combination,
   an input member having a sun gear,
   a planet carrier disposed about said sun gear and having a brake surface,
   at least two planet gears rotatably disposed in said planet carrier,
   a ring gear disposed about and engaged by said planet gears,
   a brake band disposed about said brake surface and having a pair of ends,
   a rotary actuator driving a cam
   a cam follower, and
   a lever having a first end engaging one of said pair of ends of said brake band and a second end for receiving said cam follower,
   wherein rotation of said cam tightens said brake band.

2. The planetary gear carrier brake assembly of claim 1, wherein said planet gears are in mesh with said sun gear, in addition to said ring gear.

3. The planetary gear and brake assembly of claim 1, wherein said cam is rotatably mounted on said shaft.

4. The shaft of claim 3, wherein said shaft is coupled to said rotary actuator.

5. The planetary gear and brake assembly of claim 1, wherein a spring assembly is operably disposed between said cam and said shaft.

6. The planetary gear and brake assembly of claim 1, wherein rotation of said shaft produces torque that transfers through said spring assembly, thereby causing rotation of said cam.

7. The planetary gear and brake assembly of claim 1, wherein said brake band includes friction material on its inner surface.

8. The planetary gear and brake assembly of claim 1, wherein said brake apply arm and said cam follower are coupled together by use of a torsion spring.

9. The planetary gear and brake assembly of claim 1, wherein said first end of lever is coupled with a cam follower spring, and said cam follower spring is also coupled to the case, wherein said cam follower spring keeps said cam follower in contact with said cam.

10. A method of restricting drag torque input into a two-speed transfer case, allowing for synchronized shifts between separate input and output members, comprising the steps of:
    providing an input member featuring a sun gear,
    providing a planet carrier featuring a brake surface,
    providing at least two planet gears, operably disposed about said planet carrier,
    providing a ring gear, operably disposed about and engaged by said plant gears, providing a brake band operably disposed about said brake surface, featuring a pair of ends,
    providing a cam driven by a rotary actuator,
    providing a cam follower, and,
    providing a lever having a first end engaging one of said pair of ends of said brake band and a second end for receiving said cam follower,
    providing that wherein rotation of said cam tightens said brake band.

11. The method of restricting drag torque input into a two-speed transfer case of claim 1, wherein by tightening said brake band, movement of said input member is restricted, and said input member and said output member become synchronized, allowing the transfer case to shift.

12. The method of restricting drag torque input into a two-speed transfer case of claim 1, wherein said brake band features friction material on its inner surface.

13. The method of restricting drag torque input into a two-speed transfer case of claim 1, wherein said cam is mounted on a shaft.

14. The method of restricting drag torque input into a two-speed transfer case of claim 1, wherein a spring assembly is also mounted on said shaft, and is coupled between said cam and said shaft.

15. The method of restricting drag torque input into a two-speed transfer case of claim 1, wherein said rotary actuator is coupled to said shaft, and drives said shaft, thereby driving said spring assembly, and said cam.

16. The method of restricting drag torque input into a two-speed transfer case of claim 1, wherein said first end of said lever also includes a cam follower spring, keeping said second end of said lever in contact with said cam.

* * * * *